(No Model.)

W. W. LEE.
MANUFACTURE OF HOLLOW HANDLED ARTICLES.

No. 437,211. Patented Sept. 30, 1890.

Witnesses:
Laurity N. Nolen
John R. Snow

Inventor:
William W. Lee
by his attorneys
Musgradier & Beach

UNITED STATES PATENT OFFICE.

WILLIAM WILSON LEE, OF NORTHAMPTON, MASSACHUSETTS.

MANUFACTURE OF HOLLOW-HANDLED ARTICLES.

SPECIFICATION forming part of Letters Patent No. 437,211, dated September 30, 1890.

Application filed March 3, 1890. Serial No. 342,460. (No model.)

*To all whom it may concern:*

Be it known that I, WILLIAM WILSON LEE, of Northampton, in the county of Hampshire and State of Massachusetts, have invented a new and useful Method of Making Blanks for Hollow-Handled Articles, of which the following is a specification, reference being had to the accompanying drawings, in which—

Figures 1, 2:
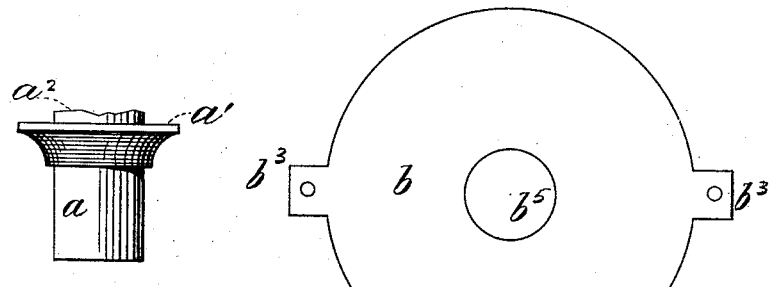
Figures 3, 4:
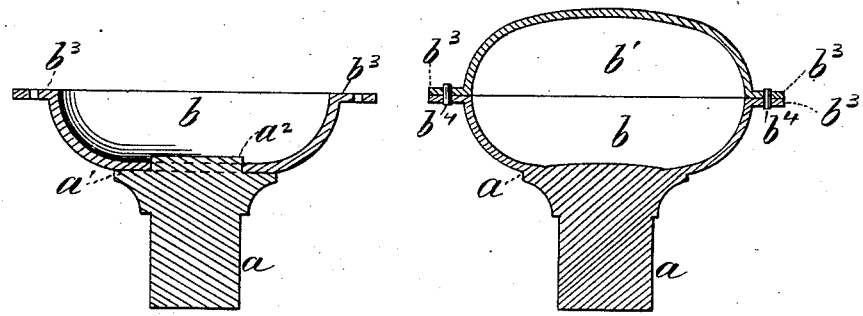
Figures 5, 6:
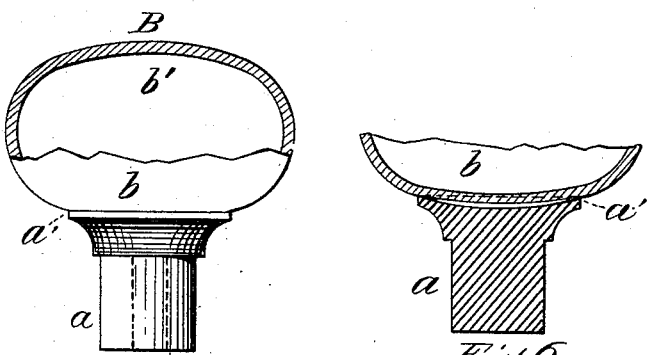

Figure 1 shows one form of stub-piece; Fig. 2, one form of sheet-metal blank, from which a shell is formed; Fig. 3, a sectional view of one form of stub-piece assembled with one form of shell; Fig. 4, a sectional view of the stub-piece and shell shown in Fig. 3 welded together and assembled with a companion shell. Fig. 5 shows one form of completed blank, partly in section. Fig. 6 shows a modification.

The object of my invention is to produce a blank for articles having hollow metallic globe-like handles; and my invention is a method of making a blank which is made up of a stub welded endwise to the side of a sheet-metal blank, which forms part of the hollow globe-like handle.

In the drawings, $a$ is a metallic stub, and $b$ a sheet-metal blank, which forms part of the hollow globe-like handle B. The stub $a$ is welded endwise to the blank $b$, and the blank $b$ then welded to the blank $b'$, which in this case, together with the blank $b$, makes up the hollow globe-like handle B—that is, the globe-like handle or shell is made up of a plurality of blanks welded together, the stub $a$ being first welded to one of the blanks and the blanks then being welded together. Either or both blanks $b\, b'$ are readily cupped in dies of proper configuration, and all the parts are welded together in ways too well known to require description, in welding-dies or by electricity, as desired. Of course the parts may be brazed instead of welded, if desired; but welding is, for well-known reasons, far better than brazing.

I prefer to form handle B of two cupped blanks, as shown, struck up from a flat blank of sheet metal, (shown in Fig. 2,) assembling them together for welding by any suitable means, as by ears $b^3$ and pins $b^4$. I consider it desirable to form a stub $a$ with a shoulder $a'$ and neck $a^2$, and to form that blank to which the stub is welded with a hole $b^5$ to receive the neck $a^2$ of the stub; but the blank may be used without forming a hole in it and the stub-piece be welded endwise to it, as shown in Fig. 6.

This hollow-handled blank is admirably adapted to be finished up into door-knobs, the stub $a$ being chambered, as shown in the drawings, or otherwise adapted for attachment to a lock-bolt. The stub-piece may be drawn out, if desired, into various implements.

The joints formed in my new blank are strong and sufficiently tight to prevent leakage of plating solution or other liquids used in finishing up the blank.

What I claim is—

The herein-described improvement in the method of making blanks for hollow-handled articles, consisting in welding a stub endwise to a blank which forms part of a hollow globe-like shell, and then forming the globe-like shell by welding together a plurality of blanks, one of which is the blank to which said stub is welded, all substantially as and for the purpose set forth.

WILLIAM WILSON LEE.

Witnesses:
C. H. PIERCE,
S. M. HILDRETH.